Nov. 2, 1965  T. ALBERS  3,215,257

SCREW CONVEYOR-TROUGH STRUCTURE

Filed Sept. 16, 1963

INVENTOR.
TEUNIS ALBERS
BY FULWIDER, PATTON,
RIEBER, LEE & UTECHT

ATTORNEYS

United States Patent Office 3,215,257
Patented Nov. 2, 1965

3,215,257
SCREW CONVEYOR-TROUGH STRUCTURE
Teunis Albers, 21205 Norwalk Blvd., Artesia, Calif.
Filed Sept. 16, 1963, Ser. No. 309,115
5 Claims. (Cl. 198—204)

The present invention relates to conveyor apparatus, and more particularly to conveyor apparatus for distributing loose feed to poultry and animals, for example.

The present conveyor apparatus is particularly suited for use in conjunction with automatic feeding systems which dispense measured quantities of loose feed for transportation through conveyor troughs to feeding stations. An exemplary system is shown and described in United States Letters Patent No. 2,706,581, issued April 19, 1955 to Teunis Albers. Such feeding systems are becoming more widely used as farmers recognize their convenience and the importance of a systematic means for feeding poultry and livestock.

In order to develop and expand the market for such systems, manufacturers are interested not only in providing systems which operate satisfactorily but also which are relatively inexpensive to manufacture, easy to install, and simple to operate and maintain. In this regard, it is also important that the conveyor apparatus of such a system be light in weight to reduce shipping costs, and yet possess ample structural integrity to perform over long periods of time with little or no maintenance. An exemplary conveyor apparatus is shown and described in United States Letters Patent No. 2,921,670, issued January 19, 1960 to Teunis Albers.

An ancillary problem attendant the use of such conveyor apparatus outdoors where it is exposed to sunlight is the differential expansion which consequently occurs between the relatively thin material of the conveyor trough and cover and the heavier, more substantial material of which the screw conveyor or other loose material-moving apparatus is constructed. The conveyor trough is generally closed by a cover so that the heat of the sun, for example, heats these exposed parts but the screw conveyor is usually buried in the loose feed being transported so that there is a measure of insulation of the screw conveyor from the outside heat. Accordingly, the conveyor trough and cover are prone to warp and buckle under the heat by virtue of the usual, substantially immovable interconnection between the conveyor trough and the hanger supporting the screw conveyor. The interconnection in prior art designs is such that relative longitudinal movement between the conveyor trough and conveyor screw hanger is impeded, or actually prevented where, for example, there is a bolted connection. In addition, in those instances where the interconnection is relatively rigid, differential thermal expansion also has the undesirable effect of concentrating the thermal expansion forces upon only those hanger bearings in the localized heated area. Desirably, such expansion forces should be borne in a balanced manner by several of the hanger bearings which are spaced along the longitudinal axis of the screw conveyor rotatably supported by such bearings.

Accordingly, it is an object of the present invention to provide conveyor apparatus which is light in weight, and yet which possesses ample structural integrity to firmly and dependably support the hangers supporting the loose material-moving apparatus. In one embodiment of the invention, the hangers are constrained against lateral movement away from the longitudinal axis of the conveyor trough, but are permitted to slide longitudinally to accommodate thermal expansion. In another embodiment the hangers are tightly gripped to constrain them against both lateral and longitudinal movement, this embodiment being primarily useful in conjunction with automatic feeding systems located indoors.

Another object of the invention is to provide conveyor apparatus of the aforementioned character and including an elongated conveyor trough having confronting sides and a bottom for supporting loose material, and wherein the sides include opposed, longitudinally extending channels for complementally receiving the opposite edge margins of a hanger for the loose material-moving apparatus, the apparatus also including a cover engageable with the conveyor trough sides to maintain the channels in their complemental relationship to the edge margins of the hanger.

A further object of the invention is the provision of conveyor apparatus of the aforementioned character wherein the oppositely located, longitudinally extending channels in the conveyor trough sides are located below the upper edge margins of the sides so that when the cover is positioned upon the upper edge margins of the sides, the cover laterally deflects such upper edge margins toward each other, tending to close the channels upon the edge margins of the hanger and constrain the hanger against appreciable movement in any direction.

Another object of the invention is to provide a conveyor apparatus of the aforementioned character in which the sides of the conveyor trough are made of sheet material adapted to be inwardly deflected upon association with the cover, whereby the bias of the trough sides tends to maintain the cover in position, and the cover, in turn, tends to maintain the opposed, longitudinally extending channels of the sides in complemental relationship with the edge margins of the hanger.

Yet another object of the invention is to provide a conveyor apparatus of the aforementioned character in which the cover is provided with a longitudinal deformation so that disposition of the cover upon the upper edge margins of the sides requires bending of the cover, the resulting bias developed by such bending tending to maintain the cover in firm engagement with the upper edge margins of the sides. It is a salient feature of the conveyor trough and cover that although each is preferably made of thin sheet material to reduce weight and cost, the inherent tendency of such thin materials to deflect and bend is utilized to provide an overall structure whose strength compares favorably with trough and cover assemblies made of thicker, more substantial materials. Moreover, utilization of thin sheet material enables the opposed, longitudinally extending channels to be formed as an integral part of the trough.

Other objects and features of the invention will become apparent from consideration of the following description taken in connection with the accompanying drawings, in which.

Figure 1:
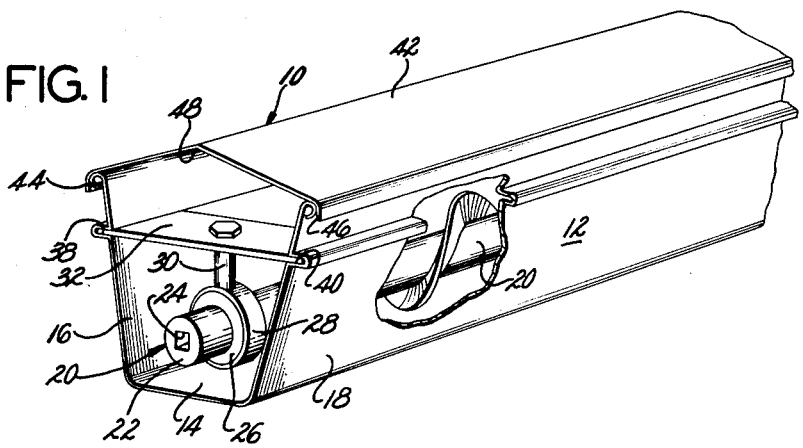
FIG. 1 is a perspective view of a section of a conveyor apparatus according to the present invention, and adapted for association with other sections to form the conveyor network of an automatic feeding system (not shown)
Figure 2:
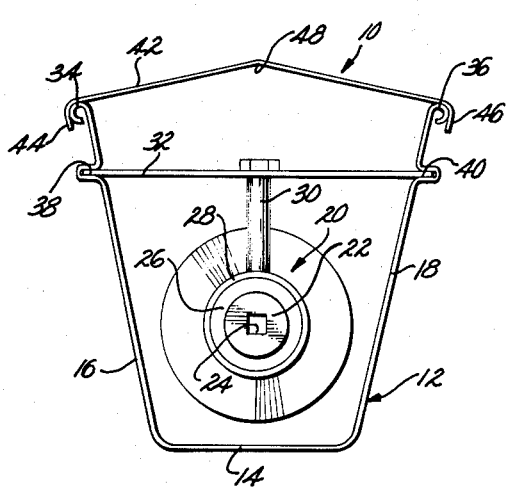
FIG. 2 is an end elevational view of the apparatus of FIG. 1.

Referring now to the drawings, and particularly to FIGS. 1 and 2 thereof, there is illustrated a conveyor apparatus 10 which is adapted to distribute loose feed material from an automatic feed dispenser and transport such material to remotely located feed stations (not shown). FIG. 1 illustrates only one section of a conveyor network, it being understood that in an operating system a number of such sections are suitably coupled together to provide a continuous feed conveyor from the automatic feed dispenser to the feeding stations.

The conveyor apparatus 10 comprises an elongated conveyor trough 12 having a susbtantially channel or U shape, and including a flat bottom 14 and a pair of confronting sides 16 and 18 extending upwardly in divergent relationship from the bottom 14.

The bottom 14 and sides 16 and 18 thus define an elongated trough along which loose feed material is conveyed or transported. An elongated loose material-moving apparatus, constituted by a screw conveyor 20, is arranged in and coextensive with the trough for the purpose of moving the loose feed material therein, only a section of the conveyor being illustrated in FIG. 1 for brevity. The screw conveyor 20 includes a central, longitudinally extending shaft 22 incorporating a square recess 24 in one end thereof for receiving a projection (not shown) on the next section of screw conveyor, and the opposite end end of the shaft 22 includes a projection (not shown) which is adapted to be received within a recess provided in the conveyor section adjacent that end, so that the various conveyor sections may be rotated in common by a suitable drive apparatus (not shown) attached to one of the sections.

The shaft 22 is rotatably supported within a plurality of bushings, one of which is illustrated at 26, made of nylon or other suitable bearing material and press-fitted within a corresponding plurality of annular bearing sleeves 28. Each sleeve 28 is attached to the lower extremity of a vertically oriented hanger pin 30 whose upper headed extremity is carried by a rectangular, laterally disposed plate or hanger 32, of which the bushing 26, sleeve 28 and pin 30 are a part. The hangers 32 are spaced at regular intervals along the length of the trough 12 to support the screw conveyor 20.

The trough 12 is made of sheet material such as sheet metal, and the upper edge margins of the hanger sides 16 and 18 are outwardly rolled or reversely bent to provide rounded upper edge portions 34 and 36, respectively. In addition, the sides 16 and 18 include opposed, inwardly opening, and longitudinally extending channels 38 and 40 located below the upper edge margins of the sides 16 and 18 in vertically spaced-apart relationship to the upper edge portions 34 and 36 thereof, the channels 38 and 40 preferably being formed as an integral part of the sides 16 and 18 by deformation thereof.

The channels 38 and 40 are adapted to receive the opposite, laterally oriented edge margins of the hanger 32 in complemental relationship, the hanger 32 being constrained against up and down movement by the sides of the channels 38 and 40 and constrained against lateral movement by the bases of the channels.

The spacing of the channels 38 and 40 below the upper edge portions 34 and 36 enables the upper extremities of the sides 16 and 18 to be inwardly flexed or deflected whereby the channels 38 and 40 tend to close upon and firmly anchor in position the lateral edge margins of the hanger 32. Thus, the embodiment of FIGS. 1 and 2 substantially prevents any movement of the hanger 32 relative to the conveyor trough 12, a construction preferably utilized in indoor installations where differential thermal expansion is usually not a problem.

The upper edge portions 34 and 36 of the trough 12 are urged toward each other to maintain the trough channels 38 and 40 in complemental relationship to the edge margins of the hanger 32 by an elongated cover 42 which is preferably made of sheet material such as sheet metal and extends coextensive with the trough 12. The lateral edge margins of the cover 42 are formed into flanges 44 and 46 which are disposed over the rounded upper edge portions 34 and 36 of the trough sides. The lateral or transverse dimension of the cover 42 is preferably such that inward deflection of the sides 16 and 18 is necessary in order to position the flanges 44 and 46 in place over the edge portions 34 and 36, the bias thus developed tending to firmly hold the cover 42 in position.

Preferably, the cover 42 is also bent or deformed, as at 48, along a longitudinal axis so that the portions of the cover 42 on opposite sides of the bend 48 are angularly disposed relative to each other. Assuming the transverse dimension of the cover 42 is less than the spacing between the edge portions 34 and 36, the cover 42 is flexed in a direction tending to bring the opposite sides of the cover 42 which are adjacent the bend 48 toward coplanar relationship. This tends to increase the transverse dimension of the cover 42 which, coupled with the inward flexing of the sides 16 and 18, allows the cover 42 to be easily and quickly located in position upon the trough 12, and yet affords ample bias in the resulting assembly to firmly maintain the cover in position.

Figure 3:
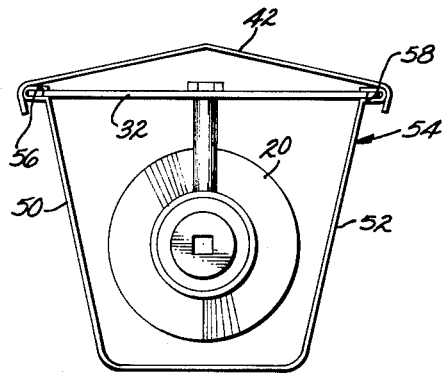
FIG. 3 is an end elevational view of a second embodiment of the present invention.

Referring now to FIG. 3, there is illustrated a second embodiment, substantially similar to the embodiment of FIGS. 1 and 2 in that it incorporates an identical hanger 32 and cover 42, but different in that the trough 54 thereof includes differently configured sides 50 and 52. More particularly, the upper edge margins of the sides 50 and 52 are deformed to provide opposed, inwardly opening, and longitudinally extending channels 56 and 58 for receiving the lateral edge margins of the hanger 32. With this arrangement, inward deflection of the sides 50 and 52 by the cover 42 firmly maintains the opposite edge margins of the hanger 32 in complemental relationship to the channels 56 and 58, but there is no tendency to deform or close the channels 56 and 58 for clamping upon the hanger 32. Thus, the hanger 32 can slide longitudinally in the channels 56 and 58 to accommodate differential thermal expansion between the screw conveyor 20 and the trough 54. Accordingly, the embodiment of FIG. 3 is particularly adapted for outdoor use where the apparatus is exposed to the sun.

Figure 4:
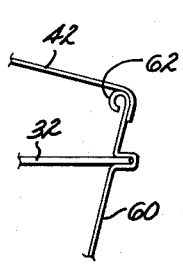
FIG. 4 is a partial end elevational view of a third embodiment of the present invention.

FIG. 4 is a partial showing of yet another embodiment of the present invention, and which is substantially identical to the showing of FIG. 2, except that the trough sides, one of which is shown at 60, are each formed so that the upper edge margin thereof is inwardly deformed to provide a rounded upper edge portion 62. This provides a closely nested relationship between the upper edge portions 62 and the adjacent flanges of the cover 42.

Figure 5:
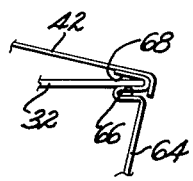
FIG. 5 is a partial end elevational view of a fourth embodiment of the present invention.

A fourth embodiment is illustrated in FIG. 5, this embodiment being substantially identical to the embodiment of FIG. 3 except that the sides thereof, one of which is shown at 64, are each formed to provide a pair of opposed, longitudinally extending, and outwardly opening channels 66, and again deformed or reversely bent to provide a pair of opposed, longitudinally extending, but inwardly opening channels 68 superjacent the channels 66. The channels 68 are adapted to receive the lateral edge margins of the hanger 32 in complemental relationship, and the cover 42 engages the sides 64 with the flanges of the cover overlying the outer base portions of the channels 68. The biasing action of the cover 42 upon the sides 64 has little or no tendency to close the channels 68 so that the hanger 32 is comparatively free to slide longitudinally within the channels 68 to accommodate differential thermal erpansion. Moreover, this arrangement affords a means for anchoring the lateral edge margins of the hanger 32 without any longitudinally extending projections protruding laterally of the exterior faces of the sides 64 of the trough.

From the foregoing, it will be apparent that a conveyor apparatus has been provided which is made of lightweight sheet material whose inherent deflection is utilized to firmly maintain the screw conveyor hangers in position, certain embodiments allowing longitudinal slidable movement of the hangers in the supporting channels, while other embodiments constrain the hangers against such longitudinal movement as well as lateral and vertical movement. Moreover, the screw conveyor 20 may be quickly installed or replaced without welding or the use of rivets, bolts, or the like by merely removing the cover and spreading apart the trough walls to enable the screw conveyor hangers to be moved into or out of engagement with the supporting channels of the trough.

Various modifications and changes may be made with regard to the foregoing detailed description without departing from the spirit of the invention or the scope of the following claims.

I claim.

1. Conveyor apparatus for transporting loose material, said apparatus comprising:
   an elongated conveyor trough having confronting, laterally deflectable sides and a bottom for supporting loose material, said sides including opposed, longitudinally extending channels;
   a hanger for supporting loose material-moving apparatus and having opposite edge margins complementally received in said opposed channels, said edge margins being disengageable from said opposed channels upon outward deflection of said sides;
   and a cover engageable with said sides to laterally deflect said sides for developing a bias whereby said cover is held in position and said channels are maintained in complemental relationship to said edge margins.

2. Conveyor apparatus for transporting loose material said apparatus comprising:
   an elongated conveyor trough having confronting sides made of laterally deflectable sheet material and a bottom for supporting loose material, said sides including opposed, longitudinally extending channels located below the upper edge margins of said sides;
   a hanger for supporting loose material-moving apparatus and having opposite edge margins complementally received in said opposed channels, said edge margins of said hanger being disengageable from said opposed channels upon outward deflection of said sides;
   and a cover engageable with said upper edge margins of said sides to maintain said channels in complemental relationship to said edge margins of said hanger, said cover laterally deflecting said upper edge margins toward each other and tending to close said channels upon said edge margins of said hanger.

3. Conveyor apparatus for transporting loose material, said apparatus comprising:
   an elongated conveyor trough having confronting sheet material sides and a bottom for supporting loose material, said sides being formed to define integral, opposed, and longitudinally extending channels, the upper edge margins of said sides being reversely formed outwardly to define rounded upper edge portions;
   a hanger for supporting loose material-moving apparatus and having opposite edge margins complementally received in said opposed channels, said edge margins of said hanger being disengageable from said opposed channels upon outward deflection of said sides;
   and a cover engageable with said upper edge portions to bias said sides toward each other to maintain said channels in complemental relationship to said edge margins.

4. Conveyor apparatus for transporting loose material, said apparatus comprising:
   an elongated conveyor trough having confronting sheet material sides and a bottom for supporting loose material, said sides being formed to define integral, opposed, and longitudinally extending channels opening outwardly and further formed to define integral, opposed, and longitudinally extending channels opening inwardly and located superjacent said outwardly opening channels;
   a hanger for supporting loose material-moving apparatus and having opposite edge margins complementally received in said inwardly opening channels, said edge margins of said hanger being disengageable from said opposed channels upon outward deflection of said sides;
   and a cover engageable with said sides to bias said sides toward each other to maintain said inwardly opening channels in complemental relationship to said edge margins.

5. Conveyor apparatus for transporting loose material, said apparatus comprising:
   an elongated conveyor trough having confronting sheet material sides and a bottom for supporting loose material, said sides being formed to define integral, opposed, and longitudinally extending channels, the upper edge margins of said sides being reversely formed inwardly to define rounded upper edge portions;
   a hanger for supporting loose material-moving apparatus and having opposite edge margins complementally received in said opposed channels, said edge margins of said hanger being disengageable from said opposed channels upon outward deflection of said sides;
   and a cover engageable with said upper edge portions to bias said sides toward each other to maintain said channels in complemental relationship to said edge margins.

References Cited by the Examiner

UNITED STATES PATENTS 2,921,670  1/60  Albers _____ 198—204

FOREIGN PATENTS 718,358  11/54  Great Britain.
1,054,173  4/59  Germany.

SAMUEL F. COLEMAN, *Primary Examiner.*

ERNEST A. FALLER, *Examiner.*